(12) United States Patent
Chen et al.

(10) Patent No.: US 11,836,938 B2
(45) Date of Patent: Dec. 5, 2023

(54) TIME-OF-FLIGHT IMAGING APPARATUS AND TIME-OF-FLIGHT IMAGING METHOD

(71) Applicant: Sony Semiconductor Solutions Corporation, Kanagawa (JP)

(72) Inventors: Ye Chen, Stuttgart (DE); Ward Van Der Tempel, Muizen (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/906,223

(22) Filed: Jun. 19, 2020

(65) Prior Publication Data
US 2021/0166407 A1  Jun. 3, 2021

(30) Foreign Application Priority Data

Jun. 18, 2019 (EP) .................................... 19180914

(51) Int. Cl.
| | | |
|---|---|---|
| *G06T 7/55* | (2017.01) | |
| *G01S 17/894* | (2020.01) | |
| *G01S 7/497* | (2006.01) | |
| *G01S 7/4915* | (2020.01) | |
| *G01S 17/26* | (2020.01) | |

(52) U.S. Cl.
CPC ................ *G06T 7/55* (2017.01); *G01S 7/497* (2013.01); *G01S 7/4915* (2013.01); *G01S 17/26* (2020.01); *G01S 17/894* (2020.01); *G06T 2207/10016* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 9,330,464 B1 * | 5/2016 | Ackerman | ............... G06T 7/521 |
| 2008/0007709 A1 * | 1/2008 | Bamji | ..................... G01C 25/00 |
| | | | 356/5.01 |
| 2012/0105585 A1 * | 5/2012 | Masalkar | ............. H04N 13/271 |
| | | | 348/46 |
| 2012/0229646 A1 * | 9/2012 | Grandidier | .............. G06T 7/254 |
| | | | 348/149 |

(Continued)

FOREIGN PATENT DOCUMENTS

| | | | |
|---|---|---|---|
| CN | 107576280 A | * | 1/2018 |
| JP | 2011203023 A | * | 10/2011 |
| WO | WO-2010139609 A1 | * | 12/2010 ............. G01S 17/36 |

OTHER PUBLICATIONS

Seiter et al., Correction of a Phase Dependent Error in a Time-of-Flight Range Sensor. Proc of SPIE. 2013. vol. 8791. 9 pages. doi:10.1117/12.2020493.

*Primary Examiner* — Mohammed Jebari
(74) *Attorney, Agent, or Firm* — Wolf, Greenfield & Sacks, P.C.

(57) ABSTRACT

The present disclosure generally pertains to a time-of-flight imaging apparatus having circuitry configured to: demodulate, in a normal operation mode for determining a distance to a scene, at a predetermined number of phase locations a modulated light sensing signal representing modulated light reflected from the scene, thereby generating imaging frames for determining the distance to the scene, and apply, during the normal operation mode, a phase sweep by shifting the predetermined number of phase locations, thereby generating phase sweep frames for determining a cyclic error.

16 Claims, 4 Drawing Sheets

(56) References Cited

U.S. PATENT DOCUMENTS

| | | | | |
|---|---|---|---|---|
| 2016/0119611 A1* | 4/2016 | Hall | ............ | G06T 7/85 |
| | | | | 348/46 |
| 2017/0041589 A1* | 2/2017 | Patil | ............ | G01S 17/894 |
| 2020/0309927 A1* | 10/2020 | Tan | ............ | G01S 7/4816 |
| 2020/0380707 A1* | 12/2020 | Takahashi | ............ | G06T 5/50 |

* cited by examiner

TIME-OF-FLIGHT IMAGING APPARATUS AND TIME-OF-FLIGHT IMAGING METHOD

CROSS-REFERENCE TO RELATED APPLICATIONS

The present application claims priority to European Patent Application 19180914.4 filed by the European Patent Office on Jun. 18, 2019, the entire contents of which being incorporated herein by reference.

TECHNICAL FIELD

The present disclosure generally pertains to a time-of-flight imaging apparatus and a time-of-flight imaging method.

TECHNICAL BACKGROUND

Generally, there are different ways of obtaining a depth image with time-of-flight (ToF) technology.

Time-of-flight includes a variety of methods that measure the time that an object, particle or wave needs for traveling a distance in a medium. Known ToF cameras can obtain depth measurements of objects in a scene for every pixel of the depth image simultaneously, wherein the depth image is captured with a ToF camera. For capturing this image, the ToF device or camera typically illuminates the scene with a modulated wave and images the backscattered wave with an image sensor having, for example, a pixel array, wherein a gain of the pixel array is modulated accordingly. An indirect time-of-flight (iToF) device typically calculates a delay between an emitted modulated light signal and the detected backscattered or reflected modulated light signal for obtaining depth measurements by sampling a correlation wave (correlation between the modulated signal and the detected demodulated light signal or signals which are representative of those signals). In a frequency domain, it is known that this delay is obtained from the phase of the first harmonic of the correlation wave (which also corresponds to the distance to be measured).

However, as it is generally known, when a signal, such as the above-mentioned correlation wave, is sampled at less than the double of the highest frequency of the correlation wave, a frequency aliasing may occur (e.g. Nyquist-Shannon theorem), which may result, in the iToF case, in a cyclic error of the depth measurement.

Therefore, it is known to perform a calibration of the ToF device on the manufacturer side, wherein the calibration provides a function for the cyclic error, which is used by the ToF device to correct a depth measurement. Such a calibration at the manufacturing stage may be time-consuming, and, thus, cost-intensive.

Although there exist techniques for providing a ToF imaging apparatus and a ToF imaging method, it is generally desirable to provide a ToF imaging apparatus and a ToF imaging method, which at least partially improve such known ToF imaging apparatuses and ToF imaging methods.

SUMMARY

According to a first aspect the disclosure provides a time-of-flight imaging apparatus comprising circuitry configured to: demodulate, in a normal operation mode for determining a distance to a scene, at a predetermined number of phase locations a modulated light sensing signal representing modulated light reflected from the scene, thereby generating imaging frames for determining the distance to the scene, and apply, during the normal operation mode, a phase sweep by shifting the predetermined number of phase locations, thereby generating phase sweep frames for determining a cyclic error.

According to a second aspect, the disclosure provides a time-of-flight imaging method comprising: demodulating, in a normal operation mode for determining a distance to a scene, at a predetermined number of phase locations a modulated light sensing signal representing modulated light reflected from the scene, thereby generating imaging frames for determining the distance to the scene, and applying, during the normal operation mode, a phase sweep by shifting the predetermined number of phase locations, thereby generating phase sweep frames for determining a cyclic error.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 7:
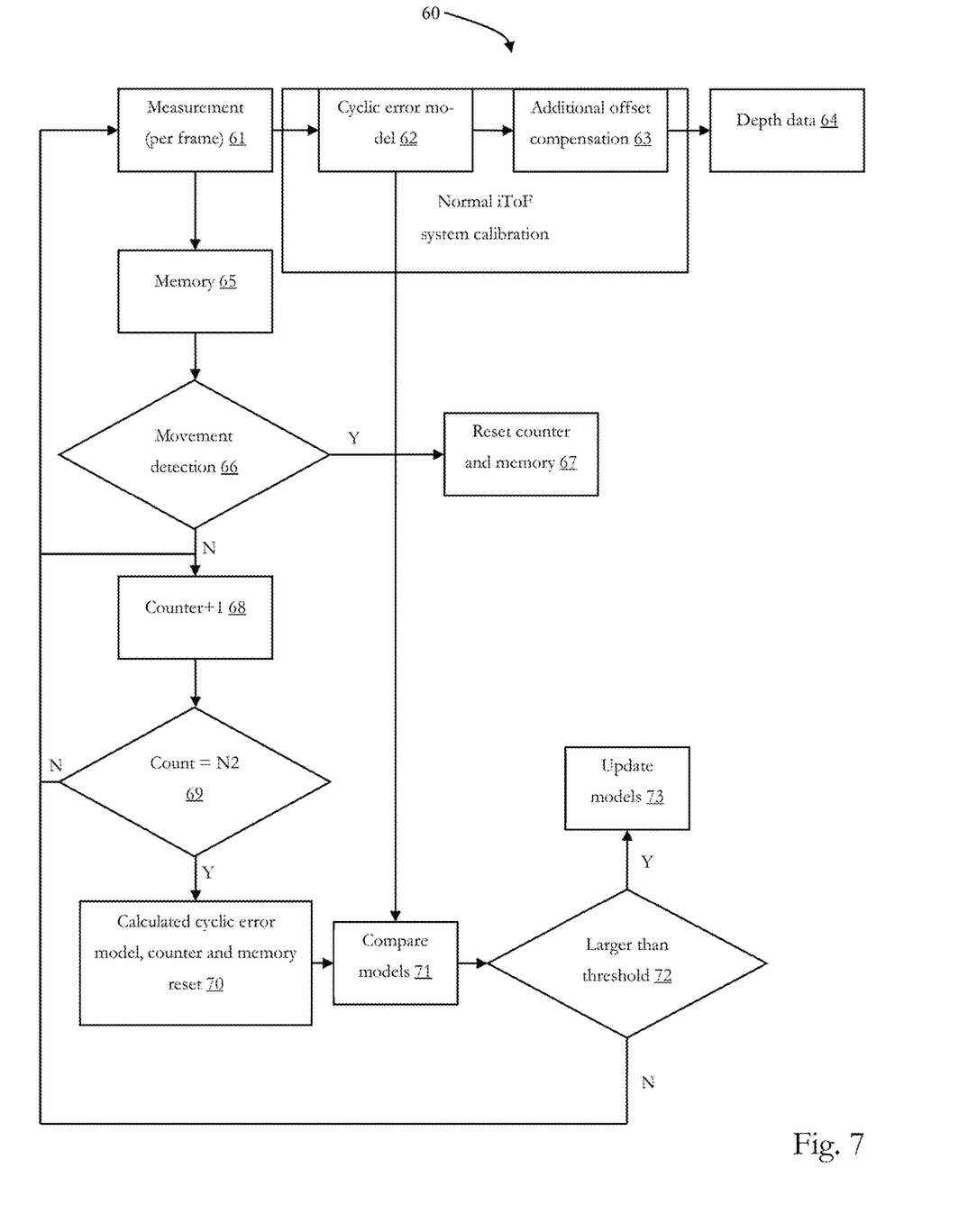
FIG. 7 depicts a block diagram of a ToF imaging method according to the present disclosure.

Before a detailed description of the embodiments under reference of FIG. 7, general explanations are made.

As mentioned in the outset, known calibrations of ToF systems, such as of indirect ToF devices, systems or cameras may performed during or at the end of a manufacturing process for determining a cyclic error.

But, there are factors, such as temperature, aging of the hardware and a different voltage supply, which may deteriorate the cyclic error after the manufacturing and therefore the calibration may deteriorate, as well.

Furthermore, it has been recognized that an initial manufacturing calibration done by the manufacturer may not compensate an interference of motion of the ToF device or a motion of the to be imaged scene (e.g. an object) during a normal operation of the ToF device, which may cause a reduced signal to noise ratio (compared to the normal operation).

Hence, the error of the measured depth information may not be compensated for, since the initial calibration may be invalidated due to these factors.

Consequently, some embodiments pertain to a time-of-flight imaging apparatus comprising circuitry configured to: demodulate, in a normal operation mode for determining a distance to a scene, at a predetermined number of phase locations a modulated light sensing signal representing modulated light reflected from the scene, thereby generating imaging frames for determining the distance to the scene, and apply, during the normal operation mode, a phase sweep by shifting the predetermined number of phase locations, thereby generating phase sweep frames for determining a cyclic error.

The circuitry may be any kind of processor, for example a central processing unit (CPU), a graphic processing unit (GPU), or the like, a field programmable gate array (FPGA), a computer, a server, or the like. It may further be (connected to) an image sensor (such as CMOS (complementary metal oxide semiconductor), CCD (charge coupled device), based on any other (diode or semiconductor, or the like) technology, e.g. CAPDs (current assisted photonic demodulator), SPADs (single photon avalanche diodes), or the like) with an integrated processor, a camera (system), or the like.

It may generally be distinguished between direct ToF (dToF), wherein a distance is determined based on a run-time of an emitted (and reflected) light signal, and indirect ToF (iToF), wherein a distance is determined based on a phase shift of a reflected light relative to the light sensing signal. As indicated in the outset, in the case of iToF, a modulated light is emitted from a light or illumination source of the ToF device (camera, apparatus, or system) to a scene. The scene reflects or scatters the modulated light and the reflected/scatter modulated light is detected by a sensor of the ToF device and it is demodulated. Thereby, a phase shift of the emitted modulated signal and the detected demodulated signal can be determined, which is indicative of the distance between the ToF device and the scene.

Based on this phase shift, which is determined by a sampling of a correlation wave of the reflected modulated light (e.g. by a modulation of transistor gates on imaging element, such as pixels), frames are associated with phase locations (which may be represented by angles between 0 to 360 degrees).

A phase location may correspond to an offset or an angular delay of the correlation wave, at which the correlation wave is sampled in order to determine a distance.

The modulated light sensing signal may refer to sensing (i.e. detection) signal for modulated light, i.e. an electric signal, which is generated by driving transistor gates on an imaging element, thereby generating a modulated signal, which has to be demodulated, i.e. read out, as it is generally known.

Thereby, imaging frames are generated, which may be represented by an electric signal, i.e. a time of modulation, or the like, included in program code, and the like, may be represented by image or sensor data of the image sensor, etc.

In general, an imaging frame may refer to a time interval in which at least one electric signal is generated and read out in order to obtain distance information.

For each imaging frame, a phase shift of the correlation wave may be determined, indicating the distance to the scene, which is determined by sampling the correlation wave at the corresponding phase location(s). Typically, the number of phase locations (e.g. per frame) can be two, three, four, or a higher number of phase locations. For instance, in the case of for phase locations, it is known that these are at 0°, 90°, 180°, 270°, without limiting the present disclosure in that regard and these numbers are only given for illustration purposes.

The normal operation mode may refer to determining the distance by using the imaging frames, as it is generally known.

However, if the correlation wave is sampled at a frequency less than two times the highest frequency of the correlation wave (which may also happen when the number of phase locations is small), a distance (or an image, or the like) may not be reconstructed, e.g. due to the Nyquist-Shannon theorem, which causes a cyclic error in the measurement (also known as frequency aliasing).

Figure 1:
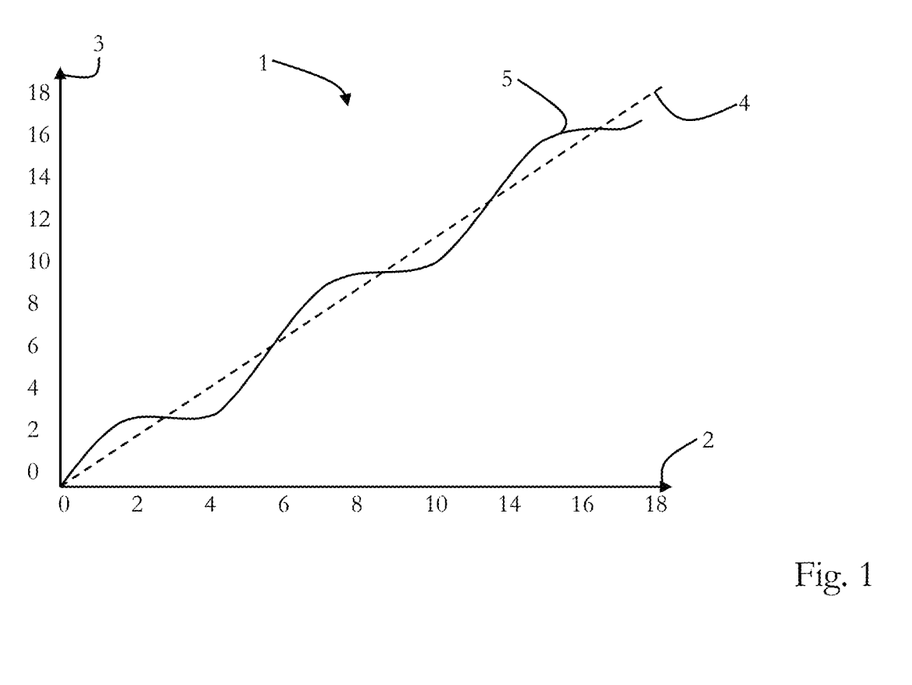
FIG. 1 depicts a graph of a cyclic error.

Cyclic error refers, in such embodiments, to a measurement error, which varies periodically with increasing distance, as displayed in FIG. 1.

FIG. 1 depicts an exemplary graph 1 displaying on the abscissa 2 an actual distance (in meters) and on the ordinate 3 a measured distance (in meters), which is deteriorated due to the cyclic error.

The function 4 shows the expected correlation of the actual distance 2 and the measured distance 3 being a linear correlation, i.e. every number of the measured distance corresponds to the same number of the actual distance.

However, due to a cyclic deviation (cyclic error) caused by a non-distinguishability of objects differing in phase by 360 degrees, the function 5, being a cyclic error function, is generated.

The function 5 deviates cyclically around the expected function 4, and is therefore called cyclic error.

In order to correct the measured distance, the cyclic error (or a function describing the cyclic error) needs to be known, which is generally determined with a calibration procedure, wherein according to known ToF devices the calibration is performed within a manufacturing process as discussed in the outset.

There are mainly two different approaches for determining the cyclic error, which are generally known to the skilled person.

According to a first approach, also referred to as "wall sweep", a known distance of an object (e.g. a wall) is varied by moving the object in a predetermined fashion and is measured in order to obtain a function like the function 5 in FIG. 1 representing the cyclic error.

According to another approach, also referred to as "phase sweep", the distance of the object remains constant, but the phase locations are varied (shifted) in a predetermined fashion and thus the distance "virtually" varies (as discussed above, the phase shift is indicative of the distance between the scene and the ToF device).

According to the present disclosure, the cyclic error is determined by performing a phase sweep during the normal operation mode of the ToF apparatus (device, camera, system, etc.), i.e. after the manufacturing and when the ToF is normal use of a user.

Therefore, the circuitry is configured to apply, during the normal operation mode, a phase sweep by shifting the predetermined number of phase locations, thereby generating phase sweep frames for determining the cyclic error.

Phase sweep frames may refer to (sub-)frames within an imaging frame, which are detecting a modulated light sensing signal based on a phase shift with respect to the imaging frame.

The predetermined number may be any (positive) number of phase locations (e.g. 4), wherein the phase locations may be 0, 90, 180, or 270, or any number between 0 and 360 (degrees) or more.

In general, the phase sweep frames may be indicated as the imaging frames (e.g. electric signal) and may therefore be generated out of the imaging frames (corresponding to the predetermined phase locations) by shifting the predetermined phase locations.

However, in other embodiments, the phase sweep frames may be based on the same phase locations as the imaging frames.

In the embodiments, a phase sweep is performed during a normal operation for determining the cyclic error.

In general, shifting may refer to an adding or subtracting of a phase value (e.g. an angle) to an imaging frame or the associated demodulation signal or in order to generate a phase sweep frame.

Figure 2:
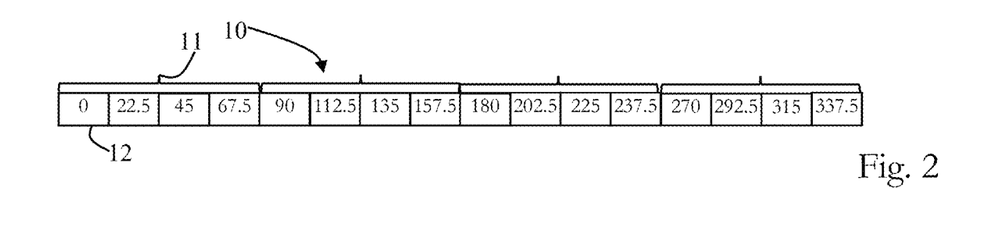
FIG. 2 depicts a timing diagram of a phase sweep according to the present disclosure.

In FIG. 2, an embodiment of a timing diagram 10 of a phase sweep is depicted. The predetermined number of phase locations is four, corresponding to four imaging frames 11, wherein the imaging frames correspond to the phase location 0, 90, 180 and 270 degrees.

Phase sweep frames 12 are generated by shifting the phase locations of the imaging frames 11 and adding an angle of 22.5 degrees to each consecutive phase sweep frame 12, whereby the "original" phase locations are each shifted by 22.5 degrees.

The phase sweep frames 12 are generated at predetermined points of time (time is increasing from left to right) and have a phase shift (or phase offset) of 22.5 degrees with respect to the previously generated phase sweep frame 12.

In this embodiment, four phase sweep frames 12 are provided, but the disclosure is not limited to that. In general, the number of phase sweep frames may be any positive number $N_1$. Also the number of imaging frames is not limited to four, as in this embodiment. In general, the number of imaging frames may be any positive number $N_2$.

After $N_2$ imaging frames, there may be a total of $N_1*N_2$ samples on a convolution versus phase shift transfer, from which a cyclic error may be determined.

In this embodiment, as discussed, four imaging frames are provided. A determination of a cyclic error function is performed during each imaging frame each including four phase sweep frames. Hence, in this embodiment, there is a total of 16 samples from which the cyclic error function is determined.

Hence, a calibration or determination of a cyclic error may be performed in real-time without the need for a (individual) pre-calibration, thereby saving production costs.

Moreover, this may compensate for temperature, process, supply voltage, aging of hardware, when the cyclic error is updated.

As discussed above, it has been recognized that the cyclic error as determined in the manufacturing process may change due to different factors, e.g. temperature, aging of hardware, voltage supply, and the initial calibration may be invalidated, as discussed above.

Therefore, in some embodiments, a phase sweep is applied within the normal imaging mode to determine a (new) cyclic error, which may be deteriorated with respect to an "old" or initial cyclic error known from a manufacturing process (or from a previous cyclic error determination).

Also, the cyclic error may be determined the first time without the need to have a determination of the cyclic error during the manufacturing process.

In some embodiments, the circuitry is further configured to perform, during the normal operation mode, a calibration by generating the phase sweep frames for determining the cyclic error and correcting the determined distance to the scene based on the determined cyclic error.

The calibration may store obtained values indicative of the cyclic error in a memory (e.g. in the form of a look-up table), or the like, which may be read out in order to correct the measured distance (and which may be updated at later points of time).

Moreover, a deconvolution curve (or function) may be generated in order to correct a distance measurement, as it is generally known.

In some embodiments, the circuitry is further configured to correct a measurement uncertainty of at least one of the measured distance and the cyclic error, wherein the measurement uncertainty is based on at least one of a movement of the time-of-flight imaging apparatus and a movement of the scene.

The measurement uncertainty may be a deterioration of a distance measurement independent of the cyclic error or also affecting the cyclic error, such as a movement of the time-of-flight imaging apparatus or a movement of the scene.

The movement (of any of the ToF apparatus or the scene) may cause a drift in phase offset which is reflected in a high frequency component of the cyclic error. In some embodiments, the high frequency component is higher than a highest order of harmonics in the cyclic error, and therefore can be filtered out when reconstructing a convolution waveform.

Hence, in some embodiments, the measurement uncertainty is corrected by filtering a high frequency component of the determined cyclic error.

Therefore, a convolution waveform may be determined (e.g. during the calibration), which has no effect caused by the drift of the phase offset. The convolution waveform may be a reference for normalizing a readout (e.g. a distance). If a measured convolution waveform is deteriorated with respect to the calibration convolution waveform, the readout may be filtered, such that the measured convolution waveform lies within a predetermined threshold of the calibration convolution waveform.

Figure 3:
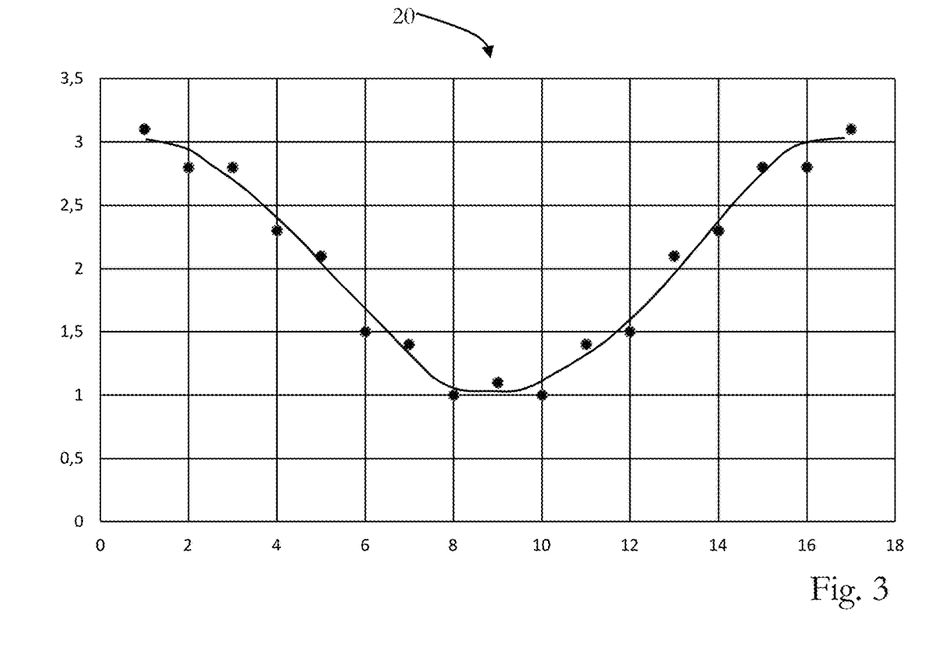
FIG. 3 shows a convolution waveform after filtering a high frequency component of a cyclic error.

FIG. 3 shows an embodiment of a calibration convolution waveform 20 (abscissa: phase locations in rad, ordinate: normalized readout, dots: readout data per phase sweep frame, line: fitting of the dots to arrive at the calibration convolution waveform).

A measured convolution waveform, i.e. the predetermined phase locations (and shifted phase locations) versus the measured distance, may be filtered such that the calibration convolution waveform 20 is generated.

Figures 4, 5:
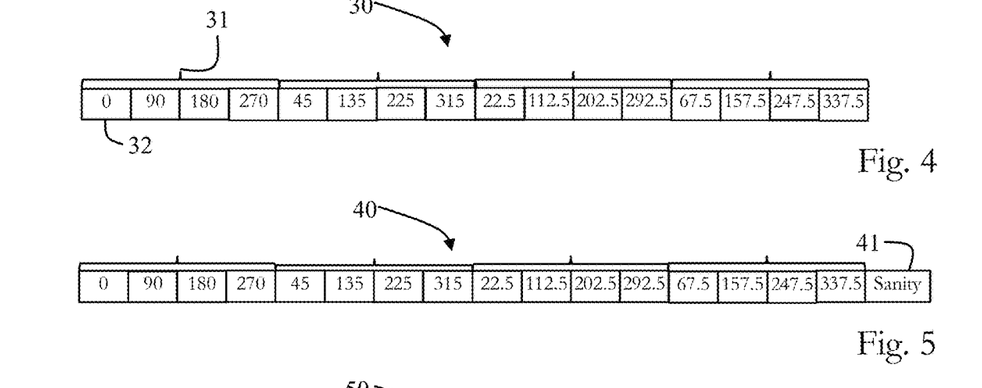
FIG. 4 depicts a further timing diagram to determine the high frequency components according to the present disclosure.
FIG. 5 depicts a timing diagram corresponding to the timing diagram of FIG. 4, but including a sanity frame at the end.

The filtering is based, in some embodiments, on a timing diagram, such as the timing diagram 30 of FIG. 4, which is only given for illustration purposes and the present disclosure is not limited to that timing diagram, and which illustrates four imaging frames 31. Each of the four imaging frames 31 (indicated with brackets) may be used for a distance measurement. The four imaging frames 31 each include four phase-sweep frames 32, which each differs from its previous (left) phase sweep frame by a phase shift of 90 degrees within the imaging frame 31 and a distance may be extracted by a fast Fourier transformation (FFT) on the data of the four imaging frames. Having the four phase sweep frames per imaging frame (i.e. in total sixteen phase sweep frames) and measuring a distance for each imaging frame gives sixteen points on the convolution waveform of FIG. 3 in order to reconstruct (by a fitting) a function describing the convolution waveform for filtering out an effect of a motion/movement of the apparatus/scene.

In some embodiments, the measurement uncertainty is corrected by collecting movement data by at least one sensor included in the time-of-flight apparatus (e.g. at least one of a gravity sensor, an inertial sensor, a camera, and a movement sensor).

Movement data may refer to any data indicating a or generated by a movement of the ToF apparatus or the scene, such as an acceleration, a turning, a translation, and the like.

The movement data collected by the at least one sensor may be utilized to subtract or add (or the like) a distance to the determined distance, or may serve as a comparison, or the like.

In some embodiments, a threshold is set on the motion/ movement. If the movement (or the value indicated by the data collected by the at least one sensor) exceeds the set threshold, the determination of the cyclic error is restarted.

In some embodiments, the measurement uncertainty is corrected by setting a threshold to the determined cyclic error.

The threshold may correspond to a measured distance compared to an actual distance, e.g. a quotient, a difference, or the like, or a measured distance compared to a stored measured distance, and the like.

If the determined cyclic error exceeds the threshold, the determination of the cyclic error may be restarted.

In some embodiments, only a certain amount of imaging elements (e.g. pixels) (the certain amount may also be referred to as "region of interest" (ROI)) need to have/detect no movement in order to provide a reference value to imaging elements which have/detect movement. The reference value may then be the basis of the determination of the cyclic error.

In some embodiments, a sanity frame is included being at least one phase sweep frame, in which the determined distance or other forms of signals calculated from phase sweep frame readouts is compared to a set distance or signal threshold value.

A sanity frame may refer to one or a plurality of phase sweep frames for determining a cyclic error during (or after, or before, or in between) an imaging operation, thereby checking the "sanity" of the ToF imaging apparatus.

If the distance or signal threshold value is exceeded in a determination of a distance or signal during the sanity frame, the determination of the cyclic error may start again.

FIG. 5 shows an embodiment of a timing diagram 40, which corresponds to the timing diagram 40 during the four imaging frames (therefore reference signs are interleaved), but after the sequence of the four imaging frames, a sanity frame 41 is appended. The sanity frame 41 corresponds to the first imaging frame (with the sequence 0, 90, 180, 270, and thus is, in this embodiment, a sequence of phase sweep frames) and the determined distance of the sanity frame is compared to the determined distance during the first imaging frame. If the determined distance during the sanity frame exceeds the set threshold with respect to the determined distance during the first imaging frame, the cyclic error is determined again.

Also in the embodiment of FIG. 5, the sanity frame does not have to be applied in each imaging element (e.g. pixel).

However, the present disclosure is not limited in that regard that the sanity frame is to be inserted after the imaging frames, but in other embodiments it may also be inserted in between the imaging frames or within an imaging frame.

Figure 6:
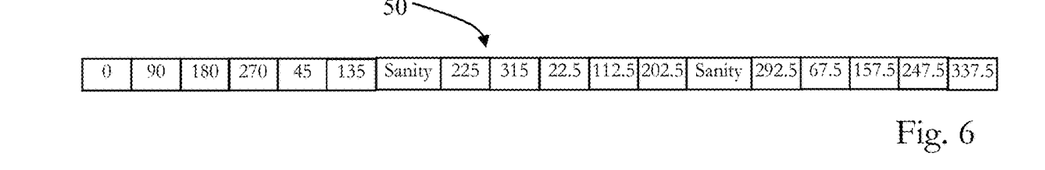
FIG. 6 depicts a timing diagram with randomly inserted sanity frames.

Also sanity frames may be inserted randomly, as shown in the timing diagram 50 of FIG. 6, which is also based on the timing diagram 40 of FIG. 4.

However, the sequence of the phase sweep frames is not limited to the embodiments of as they are shown with respect to FIGS. 4 to 6. Also other phase shifts may be applied in order to generate the phase sweep frames, more or less phase sweep frames may be generated within more or less imaging frames, and sanity frames may be inserted at any position within a timing diagram.

Moreover, the different ways of correcting the measurement uncertainty may be combined.

In some embodiments, the circuitry is further configured to update an initial cyclic error (e.g. from the manufacturing process, as described herein, or a pre-existing cyclic error, as also described). The initial cyclic error may be stored in a look-up table, a data file or the like for the correction of the cyclic error and may include multiple values, which are indicative of the cyclic error. The initial cyclic error may be based on a theoretical values, standard values, etc., which are not necessarily determined for the individual ToF apparatus.

The updating may refer to an overwriting or correcting of stored (initial) cyclic error data (e.g. in a look-up table, data file or the like), which may be stored in a memory of the ToF imaging apparatus, or the like.

In some embodiments, the shifting of the predetermined number of phase locations is different for at least two phase locations.

For example, the phase shift may be at a first predetermined point of time (as in one of the discussed timing diagrams) 40 degrees and at a second predetermined point of time it may be 50 degrees, having a sequence of 0, 40 and 130.

In some embodiments, the determination of the distance is based on a determining of a global offset for each imaging frame. The global offset may correspond to a phase shift, wherein a fixed distance may be determined differently for different phase shifts, as explained herein.

Thereby, during a cyclic error determination, also a distance determination may be performed within or for the same phase sweep frame.

In some embodiments, the circuitry is further configured to generate an imaging frame sequence including the imaging frames and the phase sweep frames.

The timing diagrams as discussed herein are an exemplary embodiment of displaying the imaging frame sequence, but in general the imaging frame sequence may be any sequence of phase locations associated with imaging frames or phase sweep frames, in which a distance is determined.

In some embodiments, the phase sweep frames are generated based on at least one of a predetermined point of time, a random point of time, after a predetermined (or random) number of imaging frames, and based on a distance detection event.

The predetermined point of time is, for example, predetermined by a user (or automatically), depending on external/environmental conditions (e.g. light conditions, weather, traffic (density), velocity), or the like. It may be after a predetermined amount of seconds, minutes, hours, milliseconds, or the like (e.g. 50 milliseconds without limiting the present disclosure to this exemplary number), and it may be periodically or recurring, such as every 50 milliseconds (without limiting the present disclosure to this exemplary number).

The random point of time may be any point of time being determined randomly (or pseudo-randomly) or based on a random event (which may in some embodiments be predetermined, e.g. rainfall, movement of the scene).

The phase sweep frames may be generated after a predetermined (or random, or pseudo-random) number of imaging frames, such as five, or after a predetermined (or random, or pseudo-random) phase-shift angle, e.g. 245 degrees, or the like.

The distance detection event may be the determination of a (predetermined or above or below a threshold) distance, the generation of imaging frames, a demodulation signal, or the like. The distance detection event may also provide a distance threshold above or below which the phase sweep frames are generated (e.g. 5 m).

Some embodiments pertain to a time-of-flight imaging method including: demodulating, in a normal operation mode for determining a distance to a scene, at a predetermined number of phase locations a modulated light sensing signal representing modulated light reflected from the scene, thereby generating imaging frames for determining the distance to the scene, and applying, during the normal operation mode, a phase sweep by shifting the predetermined number of phase locations, thereby generating phase sweep frames for determining a cyclic error, as described herein.

The method may be performed by a ToF imaging apparatus, as described herein, or any processor, such as a CPU, GPU, or the like (or combinations of processors), an FPGA, an FPGA (field programmable gate array), a (personal) computer, server, compositions of computers, server, and the like, as it is generally known, and as also discussed above.

In some embodiments, the time-of-flight imaging method further includes: performing, during the normal operation mode, a calibration by generating the phase sweep frames for determining the cyclic error and correcting the determined distance to the scene based on the determined cyclic error, as discussed herein. In some embodiments, the method further includes: correcting a measurement uncertainty of at least one of the measured distance and the cyclic error, wherein the measurement uncertainty is based on at least one of a movement of a time-of-flight imaging apparatus and a movement of the scene, as discussed herein. In some embodiments the calibration is further based on at least one of: filtering a high frequency component of the determined cyclic error; collecting movement data by at least one sensor included in the time-of-flight apparatus; setting a threshold to the determined cyclic error; and including a sanity frame being at least one phase sweep frame, in which the determined distance is compared to a set distance threshold value. In some embodiments, the at least one sensor is at least one of a gravity sensor, an inertial sensor, a camera, and a movement sensor, as discussed herein In some embodiments, the method further includes updating an initial cyclic error, as discussed herein. In some embodiments the shifting of the predetermined number of phase locations is different for at least two phase locations. In some embodiments, the determination of the distance is based on a determining of a global offset for each imaging frame.

In some embodiments, the method further includes to generating an imaging frame sequence including the imaging frames and the phase sweep frames, as discussed herein. In some embodiments, the phase sweep frames are generated based on at least one of a predetermined point of time, a random point of time, after a predetermined number of imaging frames, and based on a distance detection event, as discussed herein.

Returning to FIG. 7, a block diagram of an embodiment of a method 60 according to the present disclosure is depicted.

In 61, a ToF measurement is executed in a phase sweep frame.

In 62, a pre-existing cyclic error model (from manufacturer) is recalled, as described herein.

In 63, an additional offset compensation is executed, i.e. a deteriorated distance measurement due to the phase offset (as described with respect to FIGS. 3 and 4) is compensated for by subtraction of the global offset.

In 64, depth data is obtained based on the cyclic error model of 62 and the additional offset compensation of 63.

In 65, a memory array is accessed to store each phase sweep frame readout.

In 66, a movement detection is performed, as it is described herein. If a movement is detected, in 67 (i.e. a movement above a predetermined threshold, indicated by the letter Y on FIG. 7), a counter and the memory are reset. If no movement is detected (or is below the threshold, indicated by the letter N), the counter is not reset and counts +1, in 68. Moreover, if no movement is detected, the measurement starts again at 61, until the counter counts 4 (or any other number of frames $N_2$), in 69, as described above.

If, in 69, $N_2$ is not counted (e.g. due to a resetting of the counter or because $N_2$ it is not reached yet), the measurement 61 proceeds. If the counter has reached $N_2$, the calculated cyclic error model and the memory are reset, in 70, and, based on the output of the measured phase sweep frames, a new cyclic error model is determined.

In 71, the new cyclic error model and the pre-existing cyclic error model are compared.

Then, if the new cyclic error model exceeds a cyclic error threshold (in 72) with respect to the pre-existing cyclic error model, the pre-existing cyclic error model is updated with the new one (or overwritten), in 73.

If the cyclic error threshold is not exceeded, the method starts again at 61.

Figure 8:
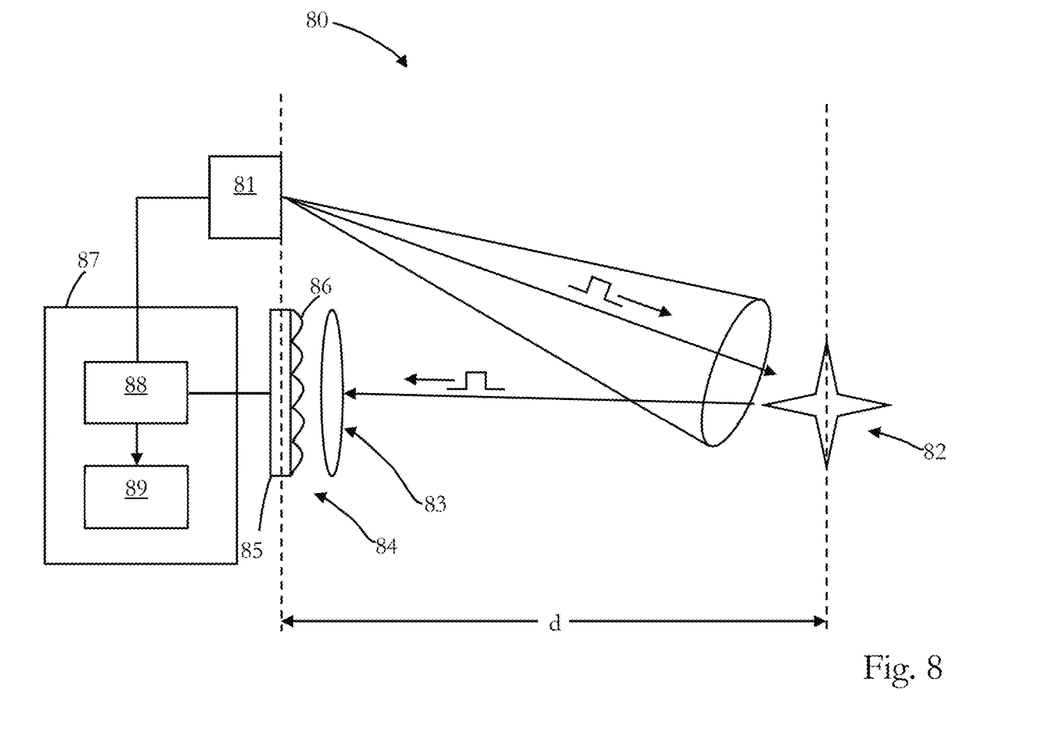
FIG. 8 depicts a block diagram of a ToF imaging apparatus according to the present disclosure.

FIG. 8 illustrates an embodiment of a time-of-flight (ToF) imaging apparatus 80 as a block diagram, which is used for depth sensing or providing a distance measurement in some embodiments, in particular for the technology as discussed herein, wherein ToF imaging apparatus 80 is configured as an iToF camera 80. The ToF imaging apparatus 80 has circuitry 87 which is configured to perform the methods as discussed herein and which forms a control of the ToF device 80 (and it includes, not shown, corresponding processors, memory and storage as it is generally known to the skilled person).

The ToF device 80 has a pulsed light source 81 and it includes light emitting elements (based on laser diodes), wherein in the present embodiment, the light emitting elements are narrow band laser elements.

The light source 81 emits pulsed light, i.e. pulse density modulates light pulses, as discussed herein, to a scene 82, which reflects the light. The reflected light is focused by an optical stack 83 to a light detector 84.

The light detector 84 has an image sensor 85, which is implemented based on multiple Gate-type pixels and a microlens array 86 which focuses the light reflected from the scene 82 to the image sensor 85 (to each pixel of the image sensor 85).

The light emission time and modulation information is fed to the circuitry or control 87 including a time-of-flight measurement unit 88, which also receives respective information from the image sensor 85, when the light is detected which is reflected from the scene 82. On the basis of the light waveform represented by the emitted pulse density modulated light pulses received from the light source 81 and the performed demodulation, the time-of-flight measurement unit 88 computes a phase shift of the received light pulses which have been emitted from the light source 81 and reflected by the scene 82 and on the basis thereon it computes a distance d (depth information) between the image sensor 85 and the scene 82, as also discussed above.

The depth information is fed from the time-of-flight measurement unit 88 to a 3D image reconstruction unit 89 of the circuitry 87, which reconstructs (generates) a 3D image of the scene 82 based on the depth information received from the time-of-flight measurement unit 88.

Figure 9:
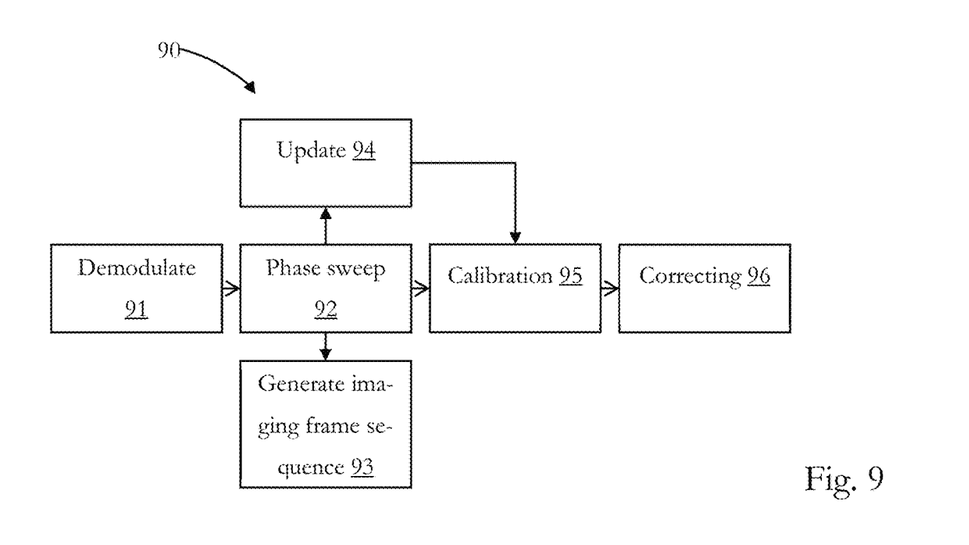
FIG. 9 depicts a block diagram of a further ToF imaging method according to the present disclosure.

FIG. 9 depicts a block diagram of a further embodiment of a ToF imaging method 90 according to the present disclosure.

In 91, the light sensing signals are demodulated, as discussed herein.

In 92, a phase sweep, as discussed herein, is performed. Within the phase sweep, in 93, an imaging frame sequence is generated. Moreover, a calibration (function) is updated in 94.

In 95, a calibration is performed based on the phase sweep to determine a cyclic error, as discussed herein.

In 96, a measured distance is corrected based on the calibration, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example the ordering of 65 and 66 in the embodiment of FIG. 7 may be exchanged. Also, the ordering of 61, 62 and 63 in the embodiment of FIG. 7 may be exchanged. Further, also the ordering of 93 and 95 in the embodiment of FIG. 9 may be exchanged. Other changes of the ordering of method steps may be apparent to the skilled person.

Moreover, the steps of demodulating the light sensing signals and applying the phase sweep are for explanatory purposes only and should not be construed as binding.

Please note that the division of the circuitry 87 into units 88 to 89 is only made for illustration purposes and that the present disclosure is not limited to any specific division of functions in specific units. For instance, the circuitry 87 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight imaging apparatus comprising circuitry configured to:

demodulate, in a normal operation mode for determining a distance to a scene, at a predetermined number of phase locations a modulated light sensing signal representing modulated light reflected from the scene, thereby generating imaging frames for determining the distance to the scene, and     apply, during the normal operation mode, a phase sweep by shifting the predetermined number of phase locations, thereby generating phase sweep frames for determining a cyclic error.

(2) The time-of-flight imaging apparatus according to (1), wherein the circuitry is further configured to perform, during the normal operation mode, a calibration by generating the phase sweep frames for determining the cyclic error and correcting the determined distance to the scene based on the determined cyclic error.

(3) The time-of-flight imaging apparatus according to anyone of (1) or (2), wherein the circuitry is further configured to correct a measurement uncertainty of at least one of the measured distance and the cyclic error, wherein the measurement uncertainty is based on at least one of a movement of the time-of-flight imaging apparatus and a movement of the scene.

(4) The time-of-flight imaging apparatus according to anyone of (1) to (3), wherein the calibration is further based on at least one of: filtering a high frequency component of the determined cyclic error; collecting movement data by at least one sensor included in the time-of-flight apparatus; setting a threshold to the determined cyclic error; and including a sanity frame being at least one phase sweep frame, in which the determined distance is compared to a set distance threshold value.

(5) The time-of-flight imaging apparatus according to anyone of (1) to (4), wherein the at least one sensor is at least one of a gravity sensor, an inertial sensor, a camera, and a movement sensor.

(6) The time-of-flight imaging apparatus according to anyone of (1) to (5), wherein the circuitry is further configured to update an initial cyclic error.

(7) The time-of-flight imaging apparatus according to anyone of (1) to (6), wherein the shifting of the predetermined number of phase locations is different for at least two phase locations.

(8) The time-of-flight imaging apparatus according to anyone of (1) to (7), wherein the determination of the distance is based on a determining of a global offset for each imaging frame.

(9) The time-of-flight imaging apparatus according to anyone of (1) to (8), wherein the circuitry is further configured to generate an imaging frame sequence including the imaging frames and the phase sweep frames.

(10) The time-of-flight imaging apparatus according to anyone of (1) to (9), wherein the phase sweep frames are generated based on at least one of a predetermined point of time, a random point of time, after a predetermined number of imaging frames, and based on a distance detection event.

(11) A time-of-flight imaging method comprising:

demodulating, in a normal operation mode for determining a distance to a scene, at a predetermined number of phase locations a modulated light sensing signal representing modulated light reflected from the scene, thereby generating imaging frames for determining the distance to the scene, and     applying, during the normal operation mode, a phase sweep by shifting the predetermined number of phase locations, thereby generating phase sweep frames for determining a cyclic error.

(12) The time-of-flight imaging method according to (11), further comprising:
performing, during the normal operation mode, a calibration by generating the phase sweep frames for determining the cyclic error and correcting the determined distance to the scene based on the determined cyclic error.

(13) The time-of-flight imaging method according to anyone of (11) or (12), further comprising:
correcting a measurement uncertainty of at least one of the measured distance and the cyclic error, wherein the measurement uncertainty is based on at least one of a movement of a time-of-flight imaging apparatus and a movement of the scene.

(14) The time-of-flight imaging method according to (13), wherein the calibration is further based on at least one of: filtering a high frequency component of the determined cyclic error; collecting movement data by at least one sensor included in the time-of-flight apparatus; setting a threshold to the determined cyclic error; and including a sanity frame being at least one phase sweep frame, in which the determined distance is compared to a set distance threshold value.

(15) The time-of-flight imaging method according to anyone of (11) to (14), wherein the at least one sensor is at least one of a gravity sensor, an inertial sensor, a camera, and a movement sensor.

(16) The time-of-flight imaging method according to anyone of (11) to (15), further comprising updating an initial cyclic error.

(17) The time-of-flight imaging method according to anyone of (11) to (16), wherein the shifting of the predetermined number of phase locations is different for at least two phase locations.

(18) The time-of-flight imaging method according to anyone of (11) to (17), wherein the determination of the distance is based on a determining of a global offset for each imaging frame.

(19) The time-of-flight imaging method according to anyone of (11) to (18), further comprising generating an imaging frame sequence including the imaging frames and the phase sweep frames.

(20) The time-of-flight imaging method according to anyone of (11) to (19), wherein the phase sweep frames are generated based on at least one of a predetermined point of time, a random point of time, after a predetermined number of imaging frames, and based on a distance detection event.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A time-of-flight imaging apparatus comprising circuitry configured to:
generate an imaging frame sequence including imaging frames, with each imaging frame including phase sweep frames;
demodulate, in a normal operation mode to determine a distance to a scene, a modulated light sensing signal representing modulated light reflected from the scene based on emission of the imaging frame sequence, wherein the phase sweep frames associated with each of the imaging frames are generated by shifting a phase associated with the imaging frame by a different amount for each of the phase sweep frames, the phase associated with each of the imaging frames being different among the imaging frames; and
determine the distance to a scene based on demodulating the modulated light sensing signal, wherein determining the distance includes determining cyclic error by determining a variation in distance indicated by the phase sweep frames within each of the imaging frames.

2. The time-of-flight imaging apparatus according to claim 1, wherein the circuitry is further configured to perform, during the normal operation mode, a calibration based on determining the cyclic error and correcting the determined distance to the scene based on the determined cyclic error.

3. The time-of-flight imaging apparatus according to claim 2, wherein the circuitry is further configured to correct a measurement uncertainty of at least one of the measured distance and the cyclic error, wherein the measurement uncertainty is based on at least one of a movement of the time-of-flight imaging apparatus and a movement of the scene.

4. The time-of-flight imaging apparatus according to claim 3, wherein the calibration is further based on at least one of: filtering a high frequency component of the determined cyclic error; collecting movement data by at least one sensor included in the time-of-flight apparatus; setting a threshold to the determined cyclic error; and including a sanity frame being at least one phase sweep frame, in which the determined distance is compared to a set distance threshold value.

5. The time-of-flight imaging apparatus according to claim 4, wherein the at least one sensor is at least one of a gravity sensor, an inertial sensor, a camera, and a movement sensor.

6. The time-of-flight imaging apparatus according to claim 1, wherein the circuitry is further configured to update an initial cyclic error.

7. The time-of-flight imaging apparatus according to claim 1, wherein the determination of the distance is based on a determining of a global offset for each imaging frame, wherein the global offset is a phase offset of an entire imaging frame.

8. The time-of-flight imaging apparatus according to claim 1, wherein the phase sweep frames are generated based on at least one of a predetermined point of time, a random point of time, after a predetermined number of imaging frames, and based on a distance detection event.

9. A time-of-flight imaging method comprising:
generating an imaging frame sequence including imaging frames, with each imaging frame including phase sweep frames, wherein the phase sweep frames associated with each of the imaging frames are generated by shifting a phase associated with the imaging frame by a different amount for each of the phase sweep frames, the phase associated with each of the imaging frames being different among the imaging frames;
demodulating, in a normal operation mode to determine a distance to a scene, a modulated light sensing signal representing modulated light reflected from the scene based on emission of the imaging frame sequence; and
determining the distance to a scene based on demodulating the modulated light sensing signal, wherein determining the distance includes determining cyclic error by determining a variation in distance indicated by the phase sweep frames within each of the imaging frames.

10. The time-of-flight imaging method according to claim 9, further comprising:

performing, during the normal operation mode, a calibration based on the determining the cyclic error and correcting the determined distance to the scene based on the determined cyclic error.

11. The time-of-flight imaging method according to claim 10, further comprising:

correcting a measurement uncertainty of at least one of the measured distance and the cyclic error, wherein the measurement uncertainty is based on at least one of a movement of a time-of-flight imaging apparatus and a movement of the scene.

12. The time-of-flight imaging method according to claim 11, wherein the calibration is further based on at least one of: filtering a high frequency component of the determined cyclic error; collecting movement data by at least one sensor included in the time-of-flight apparatus; setting a threshold to the determined cyclic error; and including a sanity frame being at least one phase sweep frame, in which the determined distance is compared to a set distance threshold value.

13. The time-of-flight imaging method according to claim 12, wherein the at least one sensor is at least one of a gravity sensor, an inertial sensor, a camera, and a movement sensor.

14. The time-of-flight imaging method according to claim 9, further comprising updating an initial cyclic error.

15. The time-of-flight imaging method according to claim 9, wherein the determination of the distance is based on a determining of a global offset for each imaging frame, wherein the global offset is a phase offset of an entire imaging frame.

16. The time-of-flight imaging method according to claim 9, wherein the phase sweep frames are generated based on at least one of a predetermined point of time, a random point of time, after a predetermined number of imaging frames, and based on a distance detection event.

* * * * *